F. W. WHELPLEY & F. A. BICKNELL.
SCREW THREAD GAGING DEVICE.
APPLICATION FILED JUNE 5, 1916.
1,223,012.
Patented Apr. 17, 1917.
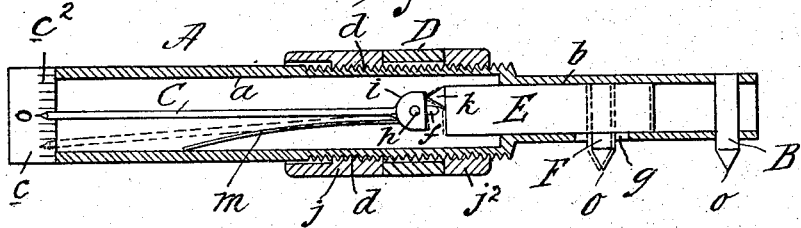
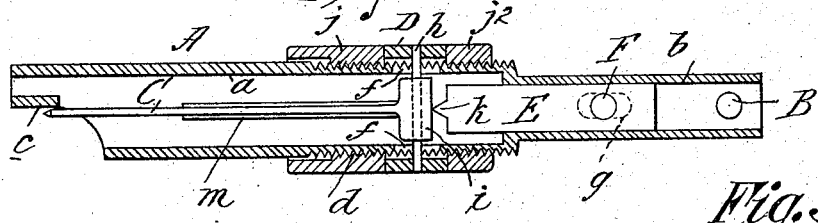
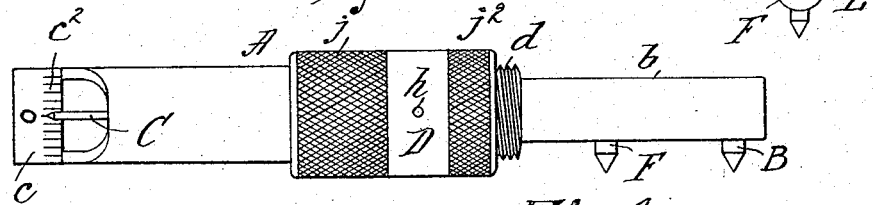
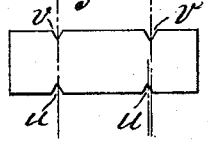
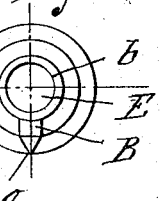
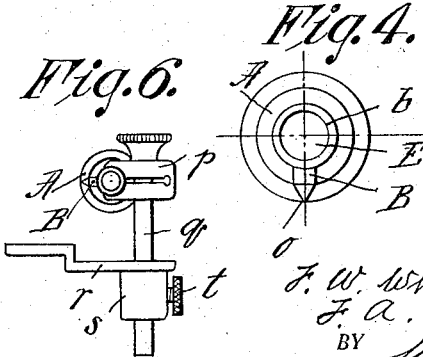
WITNESS:
G. R. Driscoll
INVENTORS,
F. W. Whelpley
F. A. Bicknell,
BY
ATTORNEY.

UNITED STATES PATENT OFFICE.

FREDERICK W. WHELPLEY AND FRANK A. BICKNELL, OF GREENFIELD, MASSACHUSETTS.

SCREW-THREAD-GAGING DEVICE.

1,223,012.   Specification of Letters Patent.   Patented Apr. 17, 1917.

Application filed June 5, 1916. Serial No. 101,700.

*To all whom it may concern:*

Be it known that we, FREDERICK W. WHELPLEY and FRANK A. BICKNELL, a British subject and a citizen of the United States of America, respectively, and residents of Greenfield, in the county of Franklin and State of Massachusetts, have invented certain new and useful Improvements in Screw-Thread-Gaging Devices, of which the following is a full, clear, and exact description.

This invention relates to a novel device or instrument for gaging and testing the pitch or "lead" of screw threaded parts, and has for its object to provide a device of simple and comparatively inexpensive structural character, and which is susceptible of quick and convenient use for determining whether the threads on an article, as for instance a tap, die or other threaded piece, and designed to be of a certain number to an inch are truly formed as per the requirement, or at variance therefrom to any appreciable extent.

The invention is described in conjunction with the accompanying drawings and is set forth in the claims.

In the drawings:—

Figures 1 and 2 are central longitudinal sections through the gaging instrument, drawn on an enlarged scale, and on planes at right angles to each other,—Fig. 1 being assumed to show the section on a vertical plane, while Fig. 2 shows the section on a horizontal plane.

Fig. 3 is a side view of the instrument; and

Fig. 4 is an end view of the same.

Fig. 5 is an end view of the slidable pointed stud carrying member elementally included in the instrument.

Fig. 6 is a view showing an attachment to be used in conjunction with the gaging instrument.

Fig. 7 is a view showing a plug or block for gaging or testing the instrument itself.

Referring to the drawings, A represents a tubular stock or barrel having the bore $a$ open from one end partway therethrough, of somewhat greater diameter than the bore $b$ through the other end portion of the stock.

The tubular stock at its end, at the terminal of the bore of the greater diameter is formed with a transversely extending tablet-like portion or plate $c$ having a graduated scale $c^2$ for showing small fractions or decimals of an inch or other unit of mensuration.

The stock has external screw threads $d$ at an intermediate portion of its length, and it is made with comparatively short longitudinally extending slots $f$ $f$ through the opposite walls thereof and intermediately of the said threaded portion.

The stock near the end portion which is of the smaller diameter, is provided with a pointed stud B fixed thereto and extended transversely for a suitable distance therefrom; and the said stock has a stud-accommodating slot $g$ through its wall at a suitable distance from the said stud B.

C represents a pointer, or needle, longitudinally ranging within the portion of the bore $a$ which is of the larger diameter and having a pivot $h$ on which it swings, so as to register at its free extremity, with the scale.

The said pivot is extended through the aforementioned opposite slots $f$ $f$ and is connected with a collar D which is provided to encircle the tubular stock at its portion in which the said slots $f$ $f$ are comprised.

The said pointer as shown is made with a widened head or enlargement $i$, and preferably through which the aforementioned pivot $h$ is passed.

The end of the said head or enlargement $i$ which is opposite or away from the free end of the needle pointer and the scale, is at right angles to the length of the pointer, which latter normally has its position in or parallel with the axis of the tubular stock.

$j$ and $j^2$ represent annular nuts screw engaging on the externally threaded portion $d$ of the stock at opposite sides of the pivot carrying collar, and operable to bind such collar between them for the adjustment of the collar with relation to the centering point of the fixed stud B.

E represents a member fitting and longitudinally slidable within the bore portion $b$ of the tubular stock,—preferably made in the form of a cylindrical plug,—and this member is provided with a transversely extended pointed stud F, affixed thereto, or formed integrally therewith, and extended through the accommodating slot $g$ therefor in the said bore portion $b$ of the stock.

The said cylindrical plug, has at its end toward and in coöperative proximity to the flat end face of the head *i* of the pointer, a short tapered projection *k* which is located, as particularly seen in Figs. 1 and 5 to one side of the axis of the pivot *h* on which the pointer swings.

*m* represents a spring, formed of flat thin steel and having one end thereof secured to the pointer near its pivot and having a deflection from such end toward and to its opposite free end, which bears against the bore-surrounding wall of the stock whereby the reaction of such spring is to throw the needle if swung against the spring to its centralized position.

The relations of the cylindrical plug D to the fixed pointed stud B and the face of the head of the needle are such, under normal conditions, that the points *o o* of the studs B and F will be at a predetermined distance, as for instance one-half of an inch to correspond with the pitches of some number of threads, for instance that of six threads comprised in a half inch of the length of a screw, having twelve threads to the inch; and the projection *k* eccentrically located at the end of the slidable plug toward the needle will be in bearing against the flat face of the head of the needle, at a point off to one side of the pivot so as to retain the needle normally in alinement with the axis of the tubular stock whereby the needle will register at zero on the scale.

If in bringing the points *o o* of the studs into gaging relations to the threads of the part to be tested, and the tapered points exactly match or coincide with the threads, the screw threaded part is seen to properly stand the gaging test; but if the distance between the bottoms of a given number of threads varies from the predetermined normal distance between the points of the studs B and E, the cylindrical plug E will be slightly crowded endwise either against the face of the head of the pointer or for a withdrawal therefrom in a slight extent according as to whether the lead of the screw is excessive or deficient.

In the one case a leverage action will be exerted against the head of the pointer to swing it against the spring, as represented by the dotted lines in Fig. 1, the deflection to be observed on the plus side of the scale, or in the other case the pointer will be thrown by the spring to an opposite deflection and as far as the receded projection *k* will permit, to be then observed on the minus side of the scale.

The threads of screws are mostly formed of a pitch for a certain even number of threads to the inch, or to the half inch; but screws having an uneven number of threads to the inch being sometimes made (thirteen to the inch being comparatively common), and as the instrument is preferably designed with a normal distance between the gaging studs of one-half inch, for the gaging of threads, an odd number of which will constitute an inch in the length or lead of the part, the desirability for the adjustment of the instrument is apparent, and, therefore, while the points of the gaging studs might, for instance, be normally spaced either seven or six thirteenths of an inch apart, the needle with its head, spring and pivot, will be bodily adjusted endwise of the stock by the unscrewing of one of the annular nuts, moving the collar D and following it up to be bound by the other annular nut $j^2$, or vice versa.

The instrument described may conveniently and effectively be employed for gaging internal threads as well as external threads.

In Fig. 6 an attachment to the instrument is shown in end view and understood as located on the part of the tubular stock of the smaller diameter and at which the gaging studs are located.

This attachment includes a clamping block *p* carrying a depending post *q* on which a table or shelf-like member *r* is vertically adjustably engaged. The table has its rear portion formed with a vertical hub or boss *s* to fit the post and to be confined thereon by the set screw *t*.

The part to be gaged may be brought to rest and squared on the member *r* and to gaging juxtaposition to the points of the gaging studs.

Changes of minor structural character may be made in some of the parts comprised in this device without departing from our invention or sacrificing any of the advantages thereof.

Fig. 7 shows a gaging block for testing the thread gaging instrument itself.

This block has notches *u u* on one side thereof spaced at an even fraction, as, for instance, one-half of an inch apart, while the notches *v v* on the other side are spaced at an unequal fraction, as, for instance, seven-thirteenths of an inch apart.

In use for testing the instrument for the gaging of screw threads of an even number within an inch, the notches *u u* will be brought to coincidence with the points of the studs when the parts of the instrument are in their normal relations as shown by full lines in Fig. 1, and if no sliding of the cylindrical plug E is caused, the instrument will be known to be accurately adjusted; and for the testing or adjusting of the instrument for the gaging of screws having uneven number of threads to the inch, the notches *v v* will be brought into conjunction with the points of the studs F and B, all as manifest.

We claim:—

1. In a screw thread gaging instrument, in combination, a stock having a graduated scale and having a pointed stud fixed thereto and extended transversely therefrom, a pointer pivotally mounted to swing relatively to the stock and having one end registering on such scale, said pointer having a wide portion at its other end, and a member longitudinally slidable on the stock provided with a transversely extended pointed stud located at a suitable distance from the first named stud, and having at its end toward and in coöperative proximity to the pointer a projection located to one side of the pivot axis of the pointer and operable, under endwise movement of the stud-provided slidable member to cause a swinging deflection of the pivoted pointer.

2. In a screw thread gaging instrument, in combination, a tubular stock provided with a scale and having a pointed stud fixed thereto and extended transversely therefrom, and also having a slot through its wall, a pointer, longitudinally arranged within the tubular stock and pivotally mounted to swing relatively to said stock, and having one end registering on said scale, and having a wide portion at its other end, a plug fitting and longitudinally slidable within the stock and provided with a transversely extended pointed stud located at a suitable distance from the first named stud, and extended through said slot, said plug having, at its end toward and in coöperative proximity to the pointer a projection located to one side of the pivot axis of the pointer and operable, under endwise movement of the stud-provided plug to cause a swinging deflection of the pivoted pointer, and a spring against the reaction of which the pointer is swung in one direction.

3. In a screw thread gaging instrument, in combination, a stock, having a graduated scale and having a pointed stud fixed thereto and extended transversely therefrom, a pointer pivotally mounted to swing relatively to the stock and having one end registering on such scale, said pointer having a wide portion at its other end, means for adjustably positioning the axis pivot of the pointer relative to the length of the stock, and a member longitudinally slidable in the stock provided with a transversely extended pointed stud located at a suitable distance from the first named stud, and having at its end toward and in coöperative proximity to the pointer a projection located to one side of the pivot axis of the pointer.

4. In a screw thread gaging instrument, in combination, a tubular stock provided with a scale and having longitudinal slots through the opposite walls thereof, and also provided with a pointed stud fixed thereto and extended transversely therefrom, said stock having a stud accommodating slot through its wall, and in a plane right angular to that at which said opposite slots are located, a pointer, longitudinally arranged within the tubular stock and having a pivot on which it swings relatively to the scale, which pivot is extended through said opposite slots and a collar which encircles the stock at its oppositely slotted portion, and with which the ends of the pivot have connection, said pointer having one end registering with said scale and having a widened portion at its other end, a plug fitting and longitudinally slidable within the stock and provided with a transversely extended pointed stud located at a suitable distance from the first named stud, and extended through the slot in the stock therefor, said plug having, at its end toward and in coöperative proximity to the pointer, a projection located to one side of the pivot axis of the pointer and operable, under endwise movement of the stud-provided plug to cause a swinging deflection of the pivoted pointer, a spring against the reaction of which the pointer is swung in one direction, and means for confining said pivot carrying collar in endwise adjusted position on the tubular stock.

5. In a screw thread gaging instrument, in combination, a tubular stock provided with an indicating scale at one end and having external screw threads at an intermediate portion of its length, and having longitudinal slots through the opposite walls thereof, and intermediately of said threaded portion, and also provided with a pointed stud fixed thereto and extended transversely therefrom, said stock having a stud-accommodating slot through its wall at a distance from said stud, a pointer, longitudinally arranged within the tubular stock and having a pivot on which it swings relatively to the indicating scale, which pivot is extended through said opposite slots, a collar encircling the stock at its oppositely slotted portion and with which the ends of the pivot are connected, said pointer having one end registering with the scale and having a widened portion at its other end, a plug fitting and longitudinally slidable within the stock and provided with a transversely extended pointed stud located at a suitable distance from the first named stud, and extended through the accommodating slot in the stock therefor, and having, at its end toward and in coöperative proximity to the pointer, a projection located to one side of the pivot axis of the pointer and operable, under endwise movement of the stud-provided plug to cause a swinging deflection of the pivoted pointer, a spring against the reaction of which the pointer is swung in one direction, and annular nuts screw engaging on said externally threaded portion of the stock at opposite sides of the pivot carrying collar.

6. In a screw thread gaging instrument, in combination, a stock, having a graduated scale and having a pointed stud fixed thereto and extended transversely therefrom, a pointer pivotally mounted to swing relatively to the stock, to register on such scale, and having a suitably wide portion at the end opposite its free registering end, and a member longitudinally slidable in the stock provided with a transversely extended pointed stud located at a suitable distance from the first named stud, and having at its end toward and in coöperative proximity to the pointer a projection located to one side of the pivot axis of the pointer and operable, under endwise movement of the stud-provided slidable member to exert a leverage action upon the widened portion of the pointer, and means whereby, as between the pointer and the said projection, the one may be endwise adjusted in relation to the other.

Signed by us at Greenfield, Mass., in presence of two subscribing witnesses.

FREDERICK W. WHELPLEY.
FRANK A. BICKNELL.

Witnesses:
ROLAND A. FRYE,
HERBERT S. HURICKE.

Copies of this patent may be obtained for five cents each, by addressing the "Commissioner of Patents, Washington, D. C."